United States Patent [19]

Cavalcante

[11] Patent Number: 4,820,410
[45] Date of Patent: Apr. 11, 1989

[54] FILTER DEVICE, PARTICULARLY FOR AQUARIUMS

[75] Inventor: Vittorio Cavalcante, Dueville, Italy

[73] Assignee: ASKOLL S.r.l., Dueville, Italy

[21] Appl. No.: 44,851

[22] Filed: May 1, 1987

[30] Foreign Application Priority Data

May 6, 1986 [IT] Italy ............................... 30693/86[U]

[51] Int. Cl.⁴ ............................................. A01K 63/04
[52] U.S. Cl. ................................. 210/169; 210/416.2; 210/418; 119/3; 119/5
[58] Field of Search .................... 210/169, 416.2, 136, 210/418; 119/5

[56] References Cited

U.S. PATENT DOCUMENTS

| | | | |
|---|---|---|---|
| 3,771,544 | 11/1973 | Horvath | 210/169 |
| 4,039,453 | 8/1977 | Horvath | 210/169 |
| 4,205,719 | 6/1980 | Faris | 210/169 |
| 4,490,250 | 12/1984 | Dockery | 210/169 |
| 4,512,885 | 4/1985 | Willinger | 210/169 |
| 4,602,996 | 7/1986 | Willinger | 210/169 |

Primary Examiner—Richard V. Fisher
Assistant Examiner—Coreen Y. Lee
Attorney, Agent, or Firm—Albert Josif; Guido Modiano

[57] ABSTRACT

The filter device comprises a filter chamber, a water supply chamber associated with the filter chamber and an aspiration tube, having a first and inserted in the water supply chamber and a second end which is immersable in an aquarium. The device also comprises a centrifugal pump adapted for feeding water to the filter chamber, and an impeller housed in an impeller chamber having an aspiration port, whereon the first end of the aspiration tube is selectively positionable. The impeller is associated with a permanent magnet rotor contained in a watertight cylindrical body, externally embraced by a cluster of stator windings. The filter chamber has a water outlet and houses a container adapted for accommodating filter elements.

6 Claims, 3 Drawing Sheets

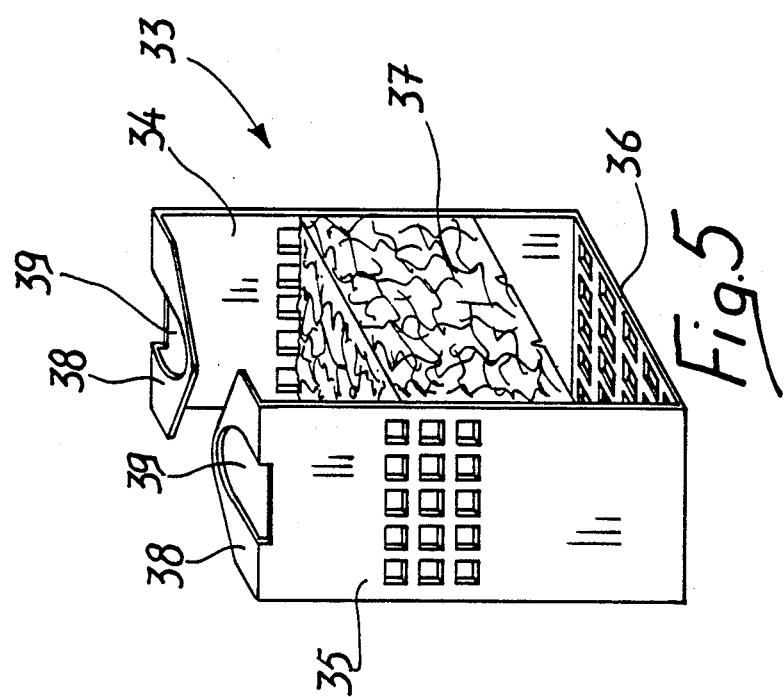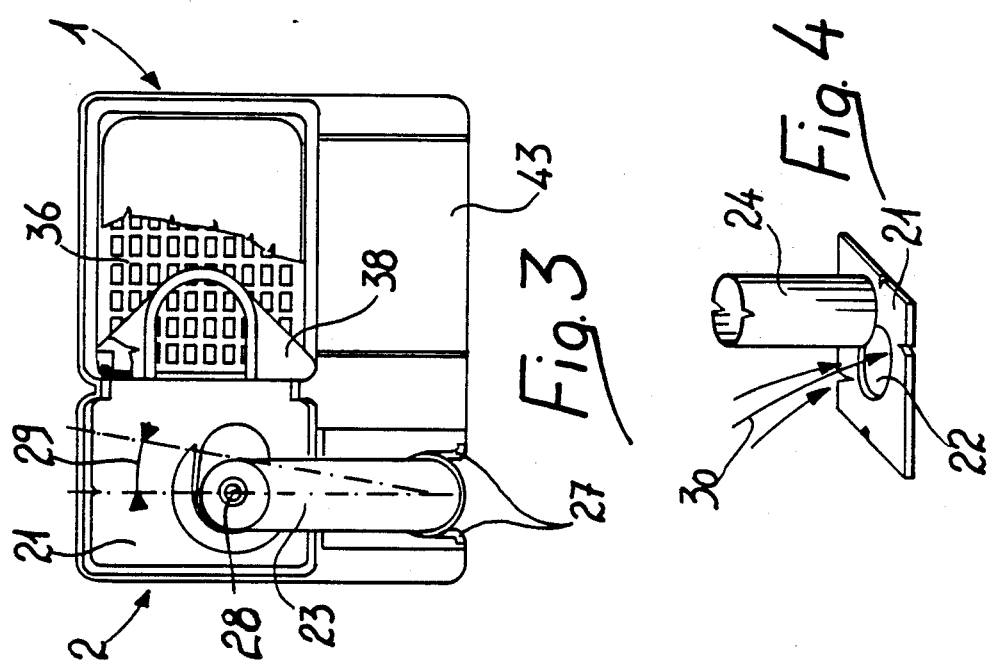

FILTER DEVICE, PARTICULARLY FOR AQUARIUMS

BACKGROUND OF THE INVENTION

The present invention relates to a filter device, particularly for aquariums.

More in particular, the object of the invention is a filter device of the type which is hooked onto the upper edge of an aquarium so as to draw, with the aspiration tube, inside the tank and so as to also have the discharge outlet in the tank.

The filter body instead remains outside the tank so that the electric parts are not wet by the water.

Usually, filter of this type are rather complicated and expensive, since they are composed of many parts.

Moreover, in the case of filters with variable flow rate, this variation is achieved simply by reducing, by means of a cutoff means, the cross section of the aspiration tube.

SUMMARY OF THE INVENTION

Accordingly, the main aim of the invention is to provide a filter for aquariums with variable flow rate, which overcomes all of the inconveniences encountered in the known types of filters for aquariums.

Within the above-cited aim, an object of the present invention is to devise a filter for aquariums with adjustment of the flow rate, which is composed of a reduced number of parts which can be easily assembled.

A further object is to provide a filter in which the adjustment of the flow rate is particularly simple, and achieved without flow cut-off devices in the aspiration tube.

Still another object is to provide a filter wherein it is simple, by virtue of its structure, to replace the filter means.

This aim, as well as this and other objects which will become apparent hereinafter, are achieved by a filter device, particularly for aquariums, characterized in that it comprises a filter chamber associated with a water supply chamber, a first end of an aspiration tube being inserted in said water supply chamber, a second end of said aspiration tube being immersable in an aquarium, said first end being positionable over the aspiration port of a chamber of an impeller of a centrifugal pump, adapted for feeding said filter chamber, said impeller being associated with a permanent-magnet rotor contained in a watertight body, externally embraced by a cluster of stator windings, in said filter chamber there being provided at least one water outlet, there being inserted a bored container adapted for accommodating filtering means.

BRIEF DESCRIPTION OF THE DRAWINGS

Further characteristics and advantages of the invention will become apparent from the detailed description of an embodiment thereof illustrated only by way of non-limitative example in the accompanying drawings, wherein:

FIG. 3 is a top plan view of the filter device according to the invention;

FIG. 4 is a schematic view of the means for varying the flow rate of the water; and FIG. 5 is a view of the container which houses the filtering means.

DESCRIPTION OF THE PREFERRED EMBODIMENTS

Figure 1:
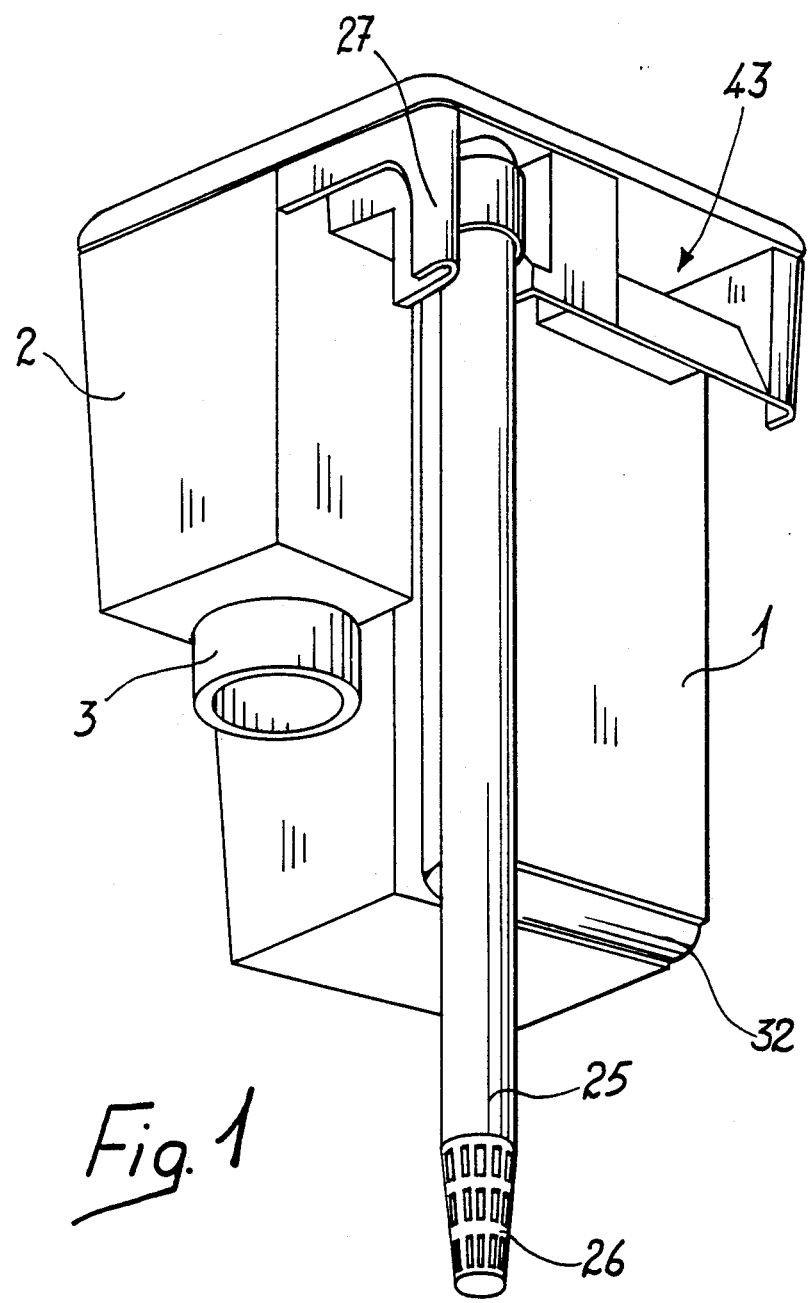
FIG. 1 is a perspective view of the filter device according to the invention.
Figure 2:
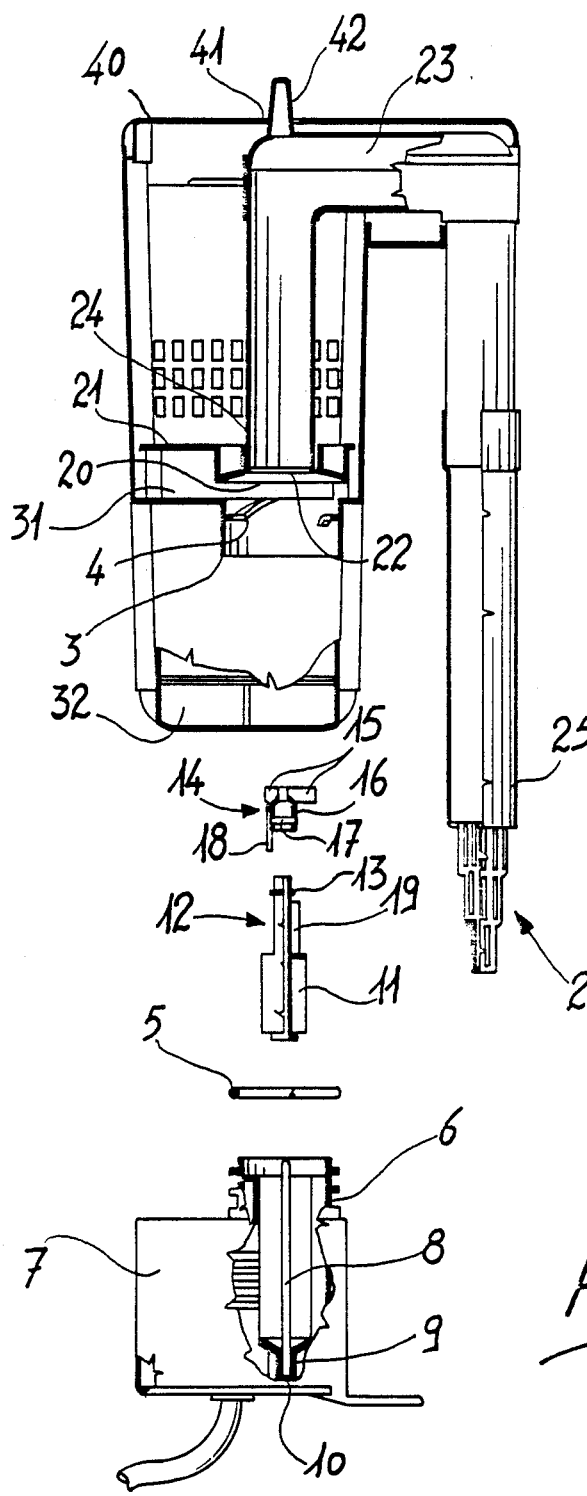
FIG. 2 is an exploded view of the filter device according to the invention.

With reference to the above described figures, the filter device according to the invention is composed of a filter chamber 1, substantially in the shape of a parallelepiped, to the side whereof is arranged a second, smaller, water supply chamber 2 which is downwardly provided with a cylindrical connection 3 which advantageously has a wide-pitch thread 4 in its interior which in practice extends through approximately 90°, on which, after a sealing ring 5 has been inserted, a sealed or watertight cylindrical body 6 is screwed, on said body there being mounted, externally and by simple interference, the cluster of the stator windings 7.

Inside said cylindrical watertight body 6, and arranged substantially axially with respect thereto, is a shaft 8, which is expediently made of metal and downwardly fixed by being force-fitted into a recess 9 provided in a projection 10 of the same body 6.

On said shaft 8, is fitted the permanent magnet rotor 11 which, in its upper part, has a cylindrical region 12, having a reduced diameter, which, proximate to its end, is provided with a toroidal projection 13 which, as will be explained hereinafter, is adapted for preventing axial movement of the impeller 14 with respect to the rotor 11.

Said impeller 14 has a plurality of radial blades 15 associated with a hollow cylindrical body 16, which is internally provided with a toroidal recess 17, adapted for engagement with said toroidal projection 13 so that the impeller is retained axially while being freely rotatable with respect to the body of the rotor 11.

Said impeller 14 is furthermore provided with a small tab 18, arranged along an outer generatrix of the cylindrical body 16, extending beyond the length of the body 16 on the opposite side with respect to the blades 15, and adapted for interacting with a lug 19 rigidly associated with the cylindrical region 12 of the rotor 11 and arranged along an external generatrix thereof.

In practice, upon starting the rotor 11, the lug 19 engages with the tab 18 of the impeller 14, thus entraining and imparting motion to the impeller 14.

Said impeller 14 is contained within a chamber 20 which is obtained by interposing in the supply chamber 2 a sector 21, having formed therein a circular hole or port 22, the center of which is coincident with the geometric axis of the impeller 14.

To supply this region with water, an aspiration tube 23 is provided, which is advantageously shaped like an upturned U, a first end 24 whereof, has a cross section substantially corresponding to the hole 22, and is positioned in front of the same hole 22, while the second end 25, provided with first filtering means 26, is arranged for drawing water from the aquarium or tank.

The tube 23 is connected to the filter chamber 1 by means of elastic engagement means 27, adapted for allowing rotation of the tube itself about a geometric axis 28 which is coincident with the longitudinal axis of the portion of tube which draws or aspirates water from the aquarium.

In this manner it is possible to rotate the tube 23 by an angle 29, so that the position of the first end 24 of the tube 23 can be varied with respect to the hole 22 formed in the sector 21 of the impeller chamber 20.

Thus, if the end 24 of the tube 23 is positioned such that it exactly overlaps the hole 22, the maximum flow rate of water will be achieved, since there will be a complete aspiration only through the tube 23.

If instead, as indicated in FIG. 4, the tube is moved by a desired angle, only part of it will be facing the hole 22, thus reducing the amount of water which is aspirated from the aquarium or tank, and taking in more water instead, from the supply chamber 2, as indicated by the arrows 30 (FIG. 4).

The impeller 14, which is of the centrifugal type, pushes the aspirated water into an outer annular chamber 31, which is completely open and in communication with the lower part 32 of said filter chamber 1.

Within said filter chamber 1, a container 33 is provided which has bored lateral walls 34 and 35, and a bored bottom 36.

Within said container 33, filtering masses 37 are contained which have the purpose of retaining the impurities carried by the water.

Said container is upwardly provided with two tabs 38 which have holes 39 to allow their easy grip during extraction.

The filter is completed by an upper closure or lid 40, wherein a slot 41 is formed, through which a control dowel 42 projects which is rigidly associated with the tube 23, the setting of the position of the tube with respect to the inlet of the impeller chamber 20 being possible by acting on said dowel, thus determining the flow rate of the pump.

It should be noted that the two chambers, i.e.; the filtering chamber 1 and the supply chamber 2, are hydraulically connected not only through the discharge path of the pump but also through the holes in the wall 35 of the container 33.

In this manner, when the inlet of the water which originates directly from the tank of the aquarium is partially cut-off or throttled, there is a continuous recirculation of the water contained in the filter, which is thus filtered many times before it is returned into the tank of the aquarium.

In the upper part, said filtering chamber 1 is provided with a discharge outlet 43 which projects with respect to the body of the filtering chamber 1 so as to be located, after assembly, inside the aquarium.

The entire assembly, composed of the two chambers, is advantageously provided monolithically by injection of plastic material in a die.

Among the advantages of the structure thus composed, there is the simplicity of manufacture of the motor-pump assembly, as well as the reliable water-tightness achieved, which is of a static type, since no rotatable seal is provided, it being thus impossible for the water to be able to affect the electrically powered parts of the stator winding cluster.

The assembly is effected by simply inserting and rotating the cylindrical body 6 within the cylindrical connection 3.

A second advantage is the constructive simplicity with which a flow rate adjustment has been achieved which, though it partially cuts off or throttles the incoming water, does not throttle the pump, which keeps on recycling and therefore filtering the water contained in the filter chamber and in the supply chamber.

A further factor of simplicity derives from the container, which allows an easy extraction of the filtering masses which can thus be either cleaned or replaced.

The structure of the filter which derives therefrom is expediently composed of a small number of parts assembled to one another in a non-critical manner without chemical or mechanical fixing means.

The entire assembly is thus particularly advantageous both from the point of view of construction and from the point of view of use.

Naturally, the materials employed and the dimensions may be any according to the amount of water to be treated and therefore according to the capacity of the aquarium for which the filter is intended.

I claim:

1. Filter device for aqariums comprising: a filter chamber having a first connection with a water supply chamber, an impeller chamber downwardly connected to said filter chamber through a second connection and upwardly connected to said water supply chamber, said impeller chamber housing an impeller operated by a motor and adapted to pump water into said filter chamber through said second connection, the device further comprising an aspiration tube substantially U-shaped and having a first end operatively connected to said impeller chamber and a second end positioned into said aquarium, said second end having a longitudinal axis, said first end of said tube abutting against a sector, said sector separating said impeller chamber from said water supply chamber and being provided with a hole connecting said impeller chamber and said supply chamber, said first end of said tube having a cross-section substantially equal to the diameter of said hole and being slideable on said sector from a first position in which said first end coincides with said hole and in which said impeller chamber receives water exclusively from said tube, and a plurality of further positions in which said first end is partially obstructed by said sector and said impeller chamber receives water from said supply chamber and at least partially from said aspiration tube, said supply chamber receiving water from said filter chamber through said first connection, said first end being slideable by acting on said tube for controlling the rate of flow of water to be filtered, said filter chamber having at least one outlet adapted to discharge filtered water into said aquarium wherein said filter chamber comprises a removable container housing filtering means, said container having walls provided with holes constituting said first connection between said filter chamber and said water supply chamber, said container also having a bored bottom connecting said container with a lower part of said filter chamber, said lower part being connected to an annular chamber surrounding said impeller.

2. Device, according to claim 1, wherein said aspiration tube is elastically engaged to said filter chamber for a rotation about an axis coinciding with said longitudinal axis, said tube also having a dowel manually operatable to rotate said tube for controlling the rate of flow of water.

3. Device, according to claim 1, wherein said filter chamber comprises a lid, said lid being removable to extract said container to clean said filtering means, said lid also having a slot from which protrudes a dowel associated with said aspiration tube, said dowel being manually operatable to rotate said tube about an axis coinciding with said longitudinal axis in order to slide said first end relatively to said sector for controlling the rate of flow of water to be filtered.

4. Device, according to claim 1, wherein a watertight body is screwed to said water supply chamber, said watertight body housing said motor.

5. Device, according to claim 4, wherein said impeller comprises a plurality of blades asociated to a hollow cylindrical body, said hollow body having a toroidal recess formed internally, said motor having a toroidal projection formed at one end, said hollow body being associable to said motor by means of said toroidal recess and projection engaging each other.

6. Device, according to claim 4, wherein said impeller comprises a plurality of blades associated to a hollow cylindrical body, said hollow body having a toroidal recess formed internally, said motor having a toroidal projection formed at one end, said hollow body being associable to said motor by means of said toroidal recess and projection engaging each other, said impeller being furthermore provided with a small tab extending along said hollow cylindrical body, a small lug being associated to said motor and engaging said small tab.

* * * * *